United States Patent Office 3,439,325
Patented Apr. 15, 1969

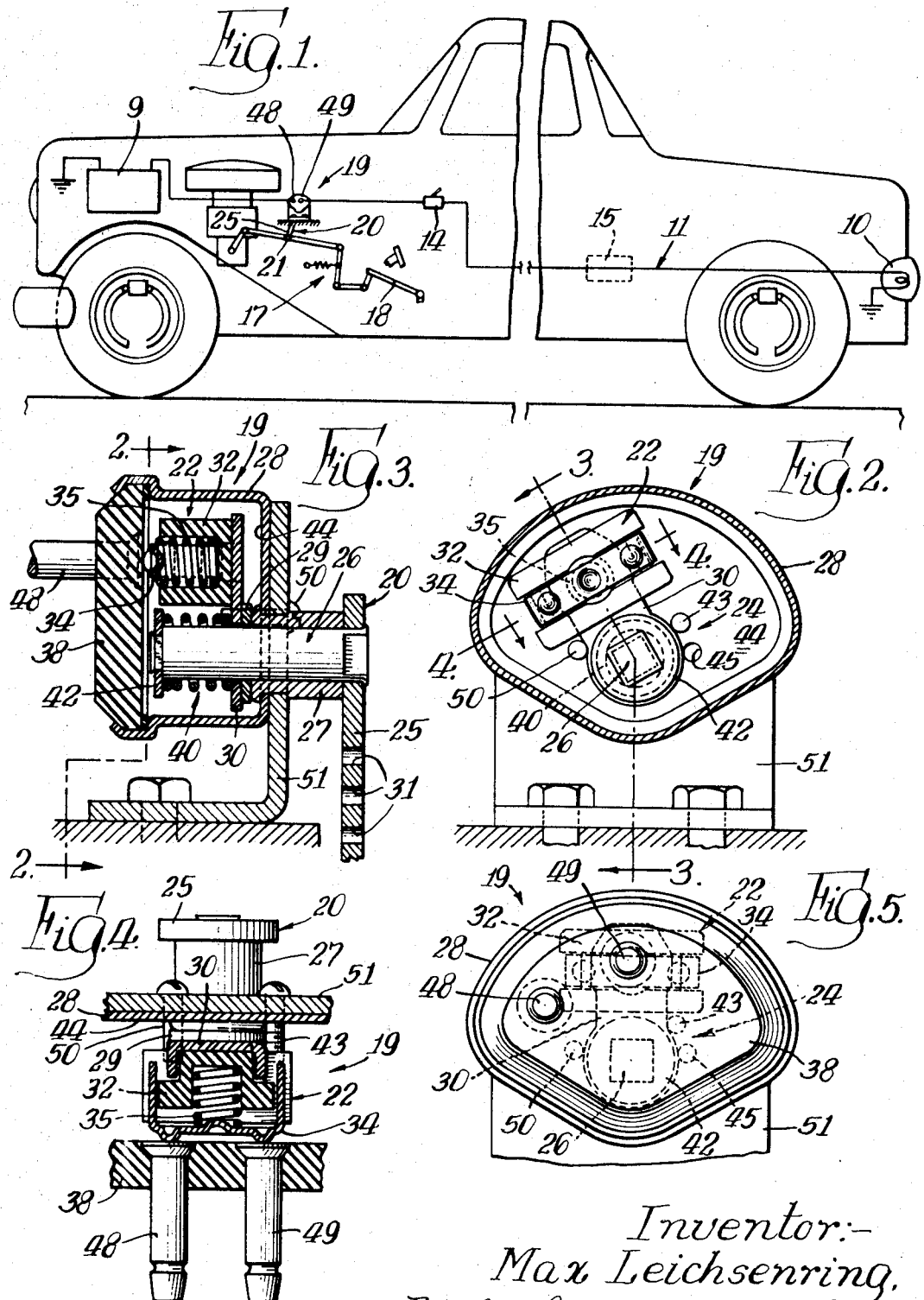

3,439,325
SIGNALLING MEANS FOR INDICATING CHANGE
IN SPEED OF AN AUTOMOTIVE VEHICLE
Max Leichsenring, 4525 N. Francisco St.,
Chicago, Ill. 60625
Filed Feb. 21, 1968, Ser. No. 707,182
Int. Cl. B60q 1/26; H01h 3/14; G08b 21/00
U.S. Cl. 340—71                          2 Claims

ABSTRACT OF THE DISCLOSURE

Signalling means for an accelerator controlled automotive vehicle having an electrically energizable warning signal embodying signal control means having connection with the accelerator linkage means for the accelerator, control switch means in frictional driving engagement with the signal control means for effecting opening and closing of the circuit means for the warning signal, and delay stop means for engaging the control switch means to arrest movement of the latter over a predetermined end portion of the range of movement of the accelerator linkage in power increasing direction, whereby upon predetermined movement of the accelerator linkage means in power decreasing direction in the predetermined end portion of the range of movement of the accelerator linkage, the control switch means effects closing of the circuit means energizing the warning signal.

---

The present invention relates to signalling means for automotive vehicles for effecting greater safety and convenience in the operation of such vehicles without removal of the foot from the accelerator pedal.

An object of the invention is to provide signalling means for an automotive vehicle embodying a warning signal which may be energized to warn a trailing motorist of a decrease in speed of the leading vehicle at any speed of the vehicle.

One of the common hazards in the driving of automotive vehicles today is that frequently a trailing vehicle too closely follows a leading vehicle, which upon deceleration of the leading vehicle frequently leaves insufficient time for the trailing motorist to observe the change in speed of the leading vehicle, and results in the trailing vehicle bumping into the rear of the leading vehicle. Also, the driver of a leading vehicle may feel that a trailing vehicle is following too closely, frequently referred to as "tail gating," and which condition the driver of the leading vehicle is unable to satisfactorily communicate to the driver of the trailing vehicle.

Automotive vehicles today include electrically energizable warning signals of one kind or another at the rear of the vehicle, such as stop lights, which are energized by application of the vehicle brakes. The present invention may be adapted to effect energization of such stop signals, or, if desired, a separate warning signal may be incorporated in the vehicle, the energization and de-energization of which may be controlled by the signalling means of the present invention.

The present invention concerns itself with signalling means having particular and simple adaptation with the accelerator linkage means for the accelerator of an automotive vehicle, and which is operable in response to movement of the accelerator linkage means. An important advantage of the invention is that the signalling means of the invention may be inorporated with the accelerator linkage means of an accelerator for the vehicle without making any changes or alterations in any of the components of the accelerator linkage means or the accelerator, and further may conveniently be utilized in connection with a warning signal, such as the stop light, already incorporated in the vehicle.

The above and other objects and advantages of the invention will appear from the following description of a preferred embodiment of the invention shown in the accompanying drawings in which—

FIGURE 1 is a diagrammatic side elevational view of an automotive vehicle embodying the signalling means of the present invention;

FIGURE 2 is a front view of signalling means of the invention with an enclosing housing therefor shown in section and portions of control switch means and signal control means in elevation with the view being taken substantially along the line 2—2 on FIGURE 3 and looking in the direction indicated by the arrows;

FIGURE 3 is a sectional view of the signalling means of FIGURE 2 with the view being taken substantially along the line 3—3 on FIGURE 2 looking in the direction indicated by the arrows;

FIGURE 4 is a sectional view of the signalling means of FIGURE 2 with the view being taken along the line 4—4 on FIGURE 2 looking in the direction indicated by the arrows; and FIGURE 5 is a front elevational view of the signalling means of FIGURE 2.

Referring now to FIGURE 1 of the drawings, the illustrated embodiment of the invention is incorporated in a conventional automotive vehicle embodying an electrically energizable warning signal 10 at the rear thereof, such as conventional stop light signals, connected in circuit means 11, which when closed, effects energization of the warning signal 10 from a source of electrical energy such as battery 9. The circuit means 11 includes the signalling means 19 of the invention, a conventional ignition switch 14, and, if desired, a known flasher device 15 to effect intermittent energization of the warning signal 10 upon closing of the circuit means 11.

Conventional accelerator linkage means 17 associated with the carburetor for the engine of the vehicle and under the control of the usual accelerator pedal 18 for controlling the speed of the vehicle in the usual manner is associated with the signalling means 19 of the invention. The signalling means 19 as best seen in FIGURES 2 and 3 comprises signal control means, as indicated at 20, control switch means 22 associated with signal control means 20, and delay stop means indicated at 24 for control switch means 22.

The signal control means 20 includes a control lever arm 25 connected as at 21 to the accelerator linkage means 17 for rotational movement by the latter in depressing and releasing the accelerator pedal 18 in the operation of the vehicle. The lever arm 25 is preferably provided with a plurality of adjustment holes 31 to provide for appropriate connection of the lever arm 25 to accelerator linkage means 17. The signal control means 20 further includes control shaft means 26 fixedly secured to the control lever arm 25 mounted for rotation in bearing 27 and extending into the housing 28 of the control switch means 22. A collar 29 is rigidly connected to control shaft means 26 for rotation therewith.

The control switch means 22 comprises a switch carrier member 30 journalled loosely about the control shaft means 26 and which has mounted at the outer end thereof a contact carrying member 32 formed of insulating material providing for the support of a contact member 34. Spring means 35 is disposed within a bore in the carrier member 32 and urges the contact member 34 outwardly toward the end wall 38 of electrical insulating material closing the open end of the housing 28.

Biasing means, indicated at 40, comprises a compression spring 41 disposed about the control shaft means 26 which is retained under compression between the contact carrier member 30 and an end washer 42 secured at the inwardly projecting end of control shaft means 26 to provide a slip type frictional driving connection between the contact carrier member 30 for rotation of the latter with control shaft means 26.

The aforementioned stop delay means 24 in the embodiment of the invention disclosed is defined, as best seen in FIGURES 2 and 5 by a pin 43 mounted in the bottom end wall 44 of the casing 28 in position to be engaged by the contact carrier member 30 to prevent rotation of the contact carrier member 30 in one direction beyond a predetermined position for purposes to be described. One or more openings 45 may be provided in the bottom end wall 44 to adjust the position at which movement of the contact carrier member is arrested. Upon turning movement of the control shaft means 26 in a direction advancing the contact carrier member 30 toward delay stop means 24 and upon engagement of the contact carrier member with the delay stop means 24 movement of the contact carrier member 30 is arrested with continued movement of the control shaft means 26 and the control lever arm 25 being permitted by the frictional slip fit provided by biasing means 40.

The insulated end wall 38 is provided with a pair of contacts 48 and 49 connected in circuit means 11 and which with the contact carrier member 30 in position at which the contact member 34 bridges the contacts 48 and 49 effects closing of the circuit means 11 to energize the warning signal 10.

An end stop member 50 is also mounted in the end wall 44 to provide an end stop position for the contact carrier member 30 in the fully released position of the accelerator pedal 18.

Preferably the aforedescribed signalling means 19 is carried by a bracket 51 to provide for the convenient mounting thereof on an automotive vehicle for connection of lever arm 25 with the accelerator linkage means 17 of the vehicle.

In the arrangement of components as above described upon depressing of the accelerator to impart movement to the vehicle, the accelerator linkage means 17 effects movement of signal control means 20 to open the circuit means 11 at contacts 48 and 49 by movement of the contact member 34 out of bridging engagement with the last noted contacts. Thus upon minimal movement of the accelerator in a direction for driving the vehicle, the circuit means 11 through the warning signal 10 is opened. Continued movement of the signal control means 20 by further depression of the accelerator pedal 18 may be continued over a predetermined range to a predetermined forward speed of the vehicle at which the contact carrier member 30 engages the delay stop means 24 which arrests movement of control switch means 22. After movement of the control switch means has been arrested as described further movement of the accelerator pedal to further increase the speed of the vehicle over a predetermined end portion of the range of movement of the accelerator and accelerator linkage means 17 is permitted by reason of the slip frictional driving connection afforded by biasing means 40.

It will be observed that upon movement of the accelerator pedal 18 in a speed decreasing direction in the end portion of the range of movement of the accelerator the frictional driving connection provided by biasing means 40 effects movement of the contact carrier member 30 to a position at which contact member 34 bridges contacts 48 and 49 to close circuit means 11 and thus energize the warning signal 10. Thus, with a vehicle traveling at a rate of speed with the accelerator pedal positioned in the aforementioned predetermined end portion of the range of movement of the accelerator pedal, release of the accelerator pedal in speed decreasing direction in predetermined amount effects movement of the control switch means 22 to close circuit means 11 and thus energize warning signal 10.

Thus, in the arrangement of components above described upon predetermined movement of the accelerator pedal in a power decreasing direction in a given range of forward speed of the vehicle effects energization of the warning signal. In this regard, the components may be arranged so that at any speed of the vehicle should the speed drop below the normal operating fluctuating speed of say 5 to 10 miles per hour, the circuit means 11 is immediately closed and the warning signal 10 is energized to alert a trailing motorist that the leading vehicle is reducing its speed considerably in preparation, for example, of slowing down for some reason, preparing to make a turn or getting ready to stop. The aforedescribed arrangement also enables the driver of a vehicle in which the signalling means is incorporated by nominal manipulation of the accelerator pedal to flash a warning signal to a trailing motorist that he is too close to the leading vehicle.

The invention claimed is:

1. Signalling means for an automotive vehicle having an electrically energizable warning signal, electric circuit means for energizing said warning signal, and accelerator linkage means movable over a fixed range in power increasing and decreasing directions, comprising the combination of a housing, a control lever arm disposed outwardly of said housing and connected to said accelerator linkage means for movement thereby, control shaft means extended into said housing and connected to said control lever arm for rotation thereby, a switch contact carrier journalled for rotation on said control shaft means within said housing, means for providing a frictional driving connection between said switch contact carrier and said control shaft means whereby said switch contact carrier is permitted to slip relative to said control shaft means, an end stop member adapted to engage said switch contact carrier to limit rotation of said switch contact carrier on said control shaft means in the power decreasing direction of said accelerator linkage means, a delay stop member adapted to engage said switch contact carrier to limit rotation of said switch contact carrier on said control shaft means in the power increasing direction of said accelerator linkage means, a first pair of switch contacts for said circut means carried in a wall of said housing, a second pair of switch contacts for said circuit means carried on said switch contact carrier and electrically connected one to the other, said second pair of switch contacts being arranged to close said circuit means between said first pair of switch contacts for energization of said warning signal when said switch contact carrier is engaged by said end stop member and to open said circuit means between said first pair of switch contacts for deenergization of said warning signal upon rotation of said switch contact carrier on said control shaft means out of engagement with said end stop member, said delay stop member and said end stop member being spaced apart by an adjustable distance so as to limit rotation of said switch contact carrier on said control shaft means over a selectively predetermined portion of the range of movement of said accelerator linkage means.

2. The signalling means of claim 1 wherein said end stop member is in the form of a pin mounted within said housing in a fixed position and said delay stop member is in the form of a pin mounted within said housing in a selected one of at least two positions.

References Cited

UNITED STATES PATENTS

| | | | |
|---|---|---|---|
| 2,153,621 | 4/1939 | Howard | 200—61.89 |
| 2,568,610 | 9/1951 | Chappell | 200—61.89 XR |
| 2,683,781 | 7/1954 | Milster | 200—61.89 |
| 2,685,006 | 7/1954 | Miller | 200—61.89 |
| 2,734,105 | 2/1956 | Perry | 340—72 XR |
| 2,836,669 | 5/1958 | Rosenberg | 200—61.89 |
| 3,286,056 | 11/1966 | Spong | 200—61.89 |
| 3,336,450 | 8/1967 | Rainer | 200—61.89 |

ALVIN H. WARING, *Primary Examiner.*

U.S. Cl. X.R.

200—61.89; 340—262